(12) United States Patent
Huang et al.

(10) Patent No.: US 7,379,970 B1
(45) Date of Patent: May 27, 2008

(54) METHOD AND SYSTEM FOR REDUCED DISTRIBUTED EVENT HANDLING IN A NETWORK ENVIRONMENT

(75) Inventors: Ruotao Huang, Mountain View, CA (US); Ram Ganesan Iyer, Houston, TX (US)

(73) Assignee: Ciphermax, Inc., Houston, TX (US)

( * ) Notice: Subject to any disclaimer, the term of this patent is extended or adjusted under 35 U.S.C. 154(b) by 676 days.

(21) Appl. No.: 10/117,290

(22) Filed: Apr. 5, 2002

(51) Int. Cl.
*G06F 15/16* (2006.01)
*G06F 15/173* (2006.01)
*G06F 11/00* (2006.01)

(52) U.S. Cl. .................. 709/206; 709/202; 709/235; 709/224; 714/4; 714/41

(58) Field of Classification Search ............... 709/203, 709/223, 221, 220, 206, 235, 202, 224; 714/4, 714/48

See application file for complete search history.

(56) References Cited

U.S. PATENT DOCUMENTS

| | | | |
|---|---|---|---|
| 4,692,073 A | 9/1987 | Martindell | 408/239 |
| 4,755,930 A | 7/1988 | Wilson, Jr. et al. | 364/200 |
| 5,140,682 A | 8/1992 | Okura et al. | 395/425 |
| 5,247,649 A | 9/1993 | Bandoh | 395/425 |
| 5,289,460 A * | 2/1994 | Drake et al. | 370/245 |
| 5,394,556 A | 2/1995 | Oprescu | 395/800 |
| 5,515,376 A | 5/1996 | Murthy et al. | 370/85.13 |
| 5,530,832 A | 6/1996 | So et al. | 395/449 |
| 5,586,847 A | 12/1996 | Mattern, Jr. et al. | 408/239 A |
| 5,602,841 A | 2/1997 | Lebizay et al. | 370/413 |
| 5,606,669 A | 2/1997 | Bertin et al. | 395/200.15 |
| 5,611,049 A | 3/1997 | Pitts | 395/200.09 |
| 5,699,548 A | 12/1997 | Choudhury et al. | 395/469 |
| 5,779,429 A | 7/1998 | Sukegawa et al. | 711/129 |
| 5,805,785 A * | 9/1998 | Dias et al. | 714/4 |
| 5,835,756 A | 11/1998 | Caccavale | 395/601 |
| 5,835,943 A | 11/1998 | Yohe et al. | 711/118 |
| 5,844,887 A | 12/1998 | Oren et al. | 370/218 |
| 5,845,280 A | 12/1998 | Treadwell, III et al. | 707/8 |
| 5,845,324 A | 12/1998 | White et al. | 711/128 |

(Continued)

OTHER PUBLICATIONS

PCT International Search Report PCT/US01/47769, 3 pages, Mailing Date Apr. 23, 2002.

(Continued)

*Primary Examiner*—Saleh Najjar
*Assistant Examiner*—Kevin Bates
(74) *Attorney, Agent, or Firm*—Baker Botts L.L.P.

(57) ABSTRACT

The present disclosure details a system, apparatus and method for reducing the redundant handling of distributed network events. In one aspect, a proxy node is selected from a plurality of network nodes and an associated network management station ("NMS") preferably addresses only the distributed events received from the proxy node. In an alternate embodiment, non-proxy nodes may be limited to reporting node-specific events to the NMS, resulting in a reduction of the number of distributed events received and processed by the NMS to those sent by the proxy node. The proxy node may be selected by the NMS or by the network nodes, in alternate implementations. Availability of the proxy node may be monitored and ensured by the network nodes or by the NMS. The selection of a proxy node is generally repeated upon the addition of nodes to the network or a lapse in proxy node availability.

14 Claims, 4 Drawing Sheets

U.S. PATENT DOCUMENTS

| | | | | |
|---|---|---|---|---|
| 5,852,717 | A | 12/1998 | Bhide et al. | 395/200.33 |
| 5,864,854 | A | 1/1999 | Boyle | 707/10 |
| 5,873,100 | A | 2/1999 | Adams et al. | 707/204 |
| 5,878,218 | A | 3/1999 | Maddalozzo, Jr. et al. | 395/200.43 |
| 5,881,229 | A | 3/1999 | Singh et al. | 395/200.33 |
| 5,918,224 | A | 6/1999 | Percival | 711/119 |
| 5,924,864 | A | 7/1999 | Loge et al. | 433/118 |
| 5,930,253 | A | 7/1999 | Brueckheimer et al. | 370/395 |
| 5,933,849 | A | 8/1999 | Srbljic et al. | 711/118 |
| 5,944,780 | A | 8/1999 | Chase et al. | 709/201 |
| 5,944,789 | A | 8/1999 | Tzelnic et al. | 709/214 |
| 5,978,841 | A | 11/1999 | Berger | 709/217 |
| 5,978,951 | A | 11/1999 | Lawler et al. | 714/758 |
| 5,987,223 | A | 11/1999 | Narukawa et al. | 395/109 |
| 5,991,810 | A | 11/1999 | Shapiro et al. | 709/229 |
| 6,041,058 | A | 3/2000 | Flanders et al. | 370/401 |
| 6,044,406 | A | 3/2000 | Barkey et al. | 709/235 |
| 6,081,883 | A | 6/2000 | Popelka et al. | 712/28 |
| 6,085,234 | A | 7/2000 | Pitts et al. | 709/217 |
| 6,098,096 | A | 8/2000 | Tsirigotis et al. | 709/213 |
| 6,105,062 | A | 8/2000 | Andrews et al. | 709/223 |
| 6,128,306 | A | 10/2000 | Simpson et al. | 370/412 |
| 6,138,209 | A | 10/2000 | Krolak et al. | 711/128 |
| 6,147,976 | A | 11/2000 | Shand et al. | 370/254 |
| 6,205,450 | B1 | 3/2001 | Kanome | 707/203 |
| 6,243,358 | B1 | 6/2001 | Monin | 370/229 |
| 6,252,514 | B1 | 6/2001 | Nolan et al. | 340/686.4 |
| 6,289,386 | B1 | 9/2001 | Vangemert | 709/232 |
| 6,361,343 | B1 | 3/2002 | Daskalakis et al. | 439/327 |
| 6,400,730 | B1 | 6/2002 | Latif et al. | 370/466 |
| 6,424,657 | B1 | 7/2002 | Voit et al. | 370/412 |
| 6,438,705 | B1 * | 8/2002 | Chao et al. | 714/4 |
| 6,457,048 | B2 | 9/2002 | Sondur et al. | 709/220 |
| 6,470,013 | B1 | 10/2002 | Barach et al. | 370/392 |
| 6,484,209 | B1 | 11/2002 | Momirov | 709/238 |
| 6,499,064 | B1 | 12/2002 | Carlson et al. | 709/316 |
| 6,532,501 | B1 | 3/2003 | McCracken | 710/52 |
| 6,584,101 | B2 | 6/2003 | Hagglund et al. | 370/389 |
| 6,594,701 | B1 | 7/2003 | Forin | 709/232 |
| 6,597,689 | B1 | 7/2003 | Chiu et al. | 370/354 |
| 6,597,699 | B1 | 7/2003 | Ayres | 370/400 |
| 6,601,186 | B1 | 7/2003 | Fox et al. | 714/4 |
| 6,615,271 | B1 | 9/2003 | Lauck et al. | 709/232 |
| 6,654,895 | B1 | 11/2003 | Henkhaus et al. | 713/320 |
| 6,657,962 | B1 | 12/2003 | Barri et al. | 370/235 |
| 6,662,219 | B1 * | 12/2003 | Nishanov et al. | 709/220 |
| 6,687,247 | B1 | 2/2004 | Wilford et al. | 370/392 |
| 6,701,318 | B2 | 3/2004 | Stuart et al. | 370/403 |
| 6,704,318 | B1 | 3/2004 | Stuart et al. | 370/403 |
| 6,721,818 | B1 | 4/2004 | Nakamura | 710/9 |
| 6,731,644 | B1 | 5/2004 | Epps et al. | 370/412 |
| 6,731,832 | B2 | 5/2004 | Alvarez et al. | 385/16 |
| 6,735,174 | B1 | 5/2004 | Hefty et al. | 370/235 |
| 6,747,949 | B1 | 6/2004 | Futral | 370/231 |
| 6,754,206 | B1 | 6/2004 | Nattkemper et al. | 370/369 |
| 6,757,791 | B1 | 6/2004 | O'Grady et al. | 711/154 |
| 6,758,241 | B1 | 7/2004 | Pfund et al. | 137/596 |
| 6,762,995 | B1 | 7/2004 | Drummond-Murray et al. | 370/229 |
| 6,765,871 | B1 | 7/2004 | Knoebel et al. | 370/231 |
| 6,765,919 | B1 | 7/2004 | Banks et al. | 370/401 |
| 6,792,507 | B2 | 9/2004 | Chiou et al. | 711/119 |
| 6,822,957 | B1 | 11/2004 | Schuster et al. | 370/389 |
| 6,839,750 | B1 | 1/2005 | Bauer et al. | 709/223 |
| 6,845,431 | B2 | 1/2005 | Camble et al. | 711/152 |
| 6,847,647 | B1 | 1/2005 | Wrenn | 370/395.32 |
| 6,865,602 | B1 | 3/2005 | Nijemcevic et al. | 709/223 |
| 6,876,668 | B1 | 4/2005 | Chawla et al. | 370/468 |
| 6,879,559 | B1 | 4/2005 | Blackmon et al. | 370/225 |
| 6,889,245 | B2 | 5/2005 | Taylor et al. | 709/203 |
| 6,938,084 | B2 * | 8/2005 | Gamache et al. | 709/226 |
| 6,941,367 | B2 * | 9/2005 | Vosseler et al. | 709/224 |
| 6,944,829 | B2 | 9/2005 | Dando | 715/798 |
| 6,954,463 | B1 | 10/2005 | Ma et al. | 370/401 |
| 6,973,229 | B1 | 12/2005 | Tzathas et al. | 385/16 |
| 6,983,303 | B2 | 1/2006 | Pellegrino et al. | 709/203 |
| 6,985,490 | B2 | 1/2006 | Czeiger et al. | 370/401 |
| 6,988,149 | B2 | 1/2006 | Odenwald | 709/250 |
| 7,010,715 | B2 | 3/2006 | Barbas et al. | 714/4 |
| 7,013,084 | B2 | 3/2006 | Battou et al. | 398/45 |
| 7,035,212 | B1 | 4/2006 | Mittal et al. | 370/230 |
| 7,079,485 | B1 | 7/2006 | Lau et al. | 370/229 |
| 7,174,557 | B2 * | 2/2007 | Sanghvi et al. | 719/318 |
| 7,190,695 | B2 | 3/2007 | Schaub et al. | 370/292 |
| 2001/0037435 | A1 | 11/2001 | Van Doren | 711/153 |
| 2001/0043564 | A1 | 11/2001 | Bloch et al. | 370/230 |
| 2002/0004842 | A1 | 1/2002 | Ghose et al. | 709/235 |
| 2002/0010790 | A1 | 1/2002 | Ellis et al. | 709/238 |
| 2002/0012344 | A1 | 1/2002 | Johnson et al. | 370/389 |
| 2002/0024953 | A1 | 2/2002 | Davis et al. | 370/395.1 |
| 2002/0034178 | A1 | 3/2002 | Schmidt et al. | 370/386 |
| 2002/0071439 | A1 | 6/2002 | Reeves et al. | 370/400 |
| 2002/0078299 | A1 | 6/2002 | Chiou et al. | 711/119 |
| 2002/0103921 | A1 | 8/2002 | Nair et al. | 709/232 |
| 2002/0118682 | A1 | 8/2002 | Choe | 370/395.3 |
| 2002/0165962 | A1 | 11/2002 | Alvarez | 709/226 |
| 2002/0176131 | A1 | 11/2002 | Walters et al. | 359/118 |
| 2002/0186703 | A1 | 12/2002 | West et al. | 370/413 |
| 2002/0188786 | A1 | 12/2002 | Barrow et al. | 710/300 |
| 2003/0002506 | A1 | 1/2003 | Moriwaki et al. | 370/392 |
| 2003/0012204 | A1 | 1/2003 | Czeiger et al. | 370/401 |
| 2003/0014540 | A1 | 1/2003 | Sultan et al. | 709/240 |
| 2003/0026267 | A1 | 2/2003 | Oberman et al. | 370/397 |
| 2003/0033346 | A1 | 2/2003 | Carlson et al. | 709/104 |
| 2003/0037022 | A1 | 2/2003 | Adya et al. | 707/1 |
| 2003/0037177 | A1 | 2/2003 | Sutton et al. | 709/316 |
| 2003/0048792 | A1 | 3/2003 | Xu et al. | 370/400 |
| 2003/0063348 | A1 | 4/2003 | Posey, Jr. | 359/139 |
| 2003/0074449 | A1 | 4/2003 | Smith et al. | 709/226 |
| 2003/0084219 | A1 | 5/2003 | Yao et al. | 710/300 |
| 2003/0091267 | A1 | 5/2003 | Alvarez et al. | 385/16 |
| 2003/0093541 | A1 | 5/2003 | Lolayekar et al. | 709/230 |
| 2003/0093567 | A1 | 5/2003 | Lolayekar et al. | 709/246 |
| 2003/0097439 | A1 | 5/2003 | Strayer et al. | 709/224 |
| 2003/0097445 | A1 | 5/2003 | Todd et al. | 709/226 |
| 2003/0126223 | A1 | 7/2003 | Jenne et al. | 709/212 |
| 2003/0126280 | A1 | 7/2003 | Hawkins et al. | 709/234 |
| 2003/0126297 | A1 | 7/2003 | Olarig et al. | 709/250 |
| 2003/0128703 | A1 | 7/2003 | Zhao et al. | 370/392 |
| 2003/0152182 | A1 | 8/2003 | Pai et al. | 375/372 |
| 2003/0154301 | A1 | 8/2003 | McEachern et al. | 709/237 |
| 2003/0163555 | A1 | 8/2003 | Battou et al. | 709/223 |
| 2003/0195956 | A1 | 10/2003 | Bramhall et al. | 709/223 |
| 2003/0198231 | A1 | 10/2003 | Kalkunte et al. | 370/395.31 |
| 2003/0202520 | A1 | 10/2003 | Witkowski et al. | 370/400 |
| 2005/0018619 | A1 | 1/2005 | Banks et al. | 370/254 |
| 2005/0018709 | A1 | 1/2005 | Barrow et al. | 370/465 |
| 2005/0044354 | A1 | 2/2005 | Hagerman | 7/160 |
| 2005/0243734 | A1 | 11/2005 | Nemirovsky et al. | 370/252 |

OTHER PUBLICATIONS

U.S. Appl. No. 10/117,040 entitled "System and Method for Expansion of Computer Network Switching System Without Disruption Thereof," filed Apr. 5, 2002 by Mark Oelke et al.

U.S. Appl. No. 10/117,266 entitled "System and Method for Guaranteed Link Layer Flow Control," filed Apr. 5, 2002 by Hani Ajus et al.

U.S. Appl. No. 10/117,638 entitled "Fibre Channel Implementation Using Network Processors," filed Apr. 5, 2002 by Yao Hawkins et al.

U.S. Appl. No. 10/117,418 entitled "System and Method for Linking a Plurality of Network Switches," filed Apr. 5, 2002 by Ram Iyer et al.

Mary Baker et al., "The Recovery Box: Using Fast Recovery to Provide High Availability in the UNIX Environment," *Summer '92 USENIX* (pp. 31-43), Jun. 8, 1992.

George Candea et al., "Microreboot—A Technique for Cheap Recovery," *Computer Systems Labs*, Stanford University, http://swig.stanford.edu/~candea/papers/microreboot/htm/index.html (31 pages), Dec. 1, 2004.

\* cited by examiner

METHOD AND SYSTEM FOR REDUCED DISTRIBUTED EVENT HANDLING IN A NETWORK ENVIRONMENT

CROSS-REFERENCE TO RELATED APPLICATIONS

This application is related to U.S. patent application Ser. No. 09/738,960 entitled "Caching System and Method for a Network Storage System" by Lin-Sheng Chiou, Mike Witkowski, Hawkins Yao, Cheh-Suei Yang, and Sompong Paul Olarig, which was filed on Dec. 14, 2000 and which is incorporated herein by reference in its entirety for all purposes; U.S. patent application Ser. No. 10/015,047 entitled "System, Apparatus and Method for Address Forwarding for a Computer Network" by Hawkins Yao, Cheh-Suei Yang, Richard Gunlock, Michael L. Witkowski, and Sompong Paul Olarig, which was filed on Oct. 26, 2001 and which is incorporated herein by reference in its entirety for all purposes; U.S. patent application Ser. No. 10/039,190 entitled "Network Processor Interface System" by Sompong Paul Olarig, Mark Lyndon Oelke, and John E. Jenne, which was filed on Dec. 31, 2001, and which is incorporated herein by reference in its entirety for all purposes; U.S. patent application Ser. No. 10/039,189 entitled "Xon/Xoff Flow Control for Computer Network" by Hawkins Yao, John E. Jenne, and Mark Lyndon Oelke, which was filed on Dec. 31, 2001, and which is incorporated herein by reference in its entirety for all purposes; and U.S. patent application Ser. No. 10/039,184 entitled "Buffer to Buffer Flow Control for Computer Network" by John E. Jenne, Mark Lyndon Oelke and Sompong Paul Olarig, which was filed on Dec. 31, 2001, and which is incorporated herein by reference in its entirety for all purposes. This application is also related to the following four U.S. patent applications: U.S. patent application Ser. No. 10/117,418, entitled "System and Method for Linking a Plurality of Network Switches," by Ram Ganesan Iyer, Hawkins Yao and Michael Witkowski, filed on Apr. 5, 2002, and which is incorporated herein by reference in its entirety for all purposes; U.S. patent application Ser. No. 10/117,040, entitled "System and Method for Expansion of Computer Network Switching System Without Disruption Thereof," by Mark Lyndon Oelke, John E. Jenne, Sompong Paul Olarig, Gary Benedict Kotzur and Matthew John Schumacher, filed on Apr. 5, 2002, and which is incorporated herein by reference in its entirety for all purposes; U.S. patent application Ser. No. 10/117,266, entitled "System and Method for Guaranteed Link Layer Flow Control," by Hani Ajus and Chung Dai, filed on Apr. 5, 2002, and which is incorporated herein by reference in its entirety for all purposes; U.S. patent application Ser. No. 10/117,638, entitled "Fibre Channel Implementation Using Network Processors," by Hawkins Yao, Richard Gunlock and Po-Wei Tan, filed on Apr. 5, 2002, and which is incorporated herein by reference in its entirety for all purposes.

BACKGROUND

1. Technical Field of the Invention

The present application is related to computer networks. More specifically, the present application is related to a system, apparatus and method for handling multiple instances of events while avoiding duplication of work in a distributed network environment.

2. Background of the Invention

The distributed nature of computer networks presents various challenges for their centralized management. One such challenge is event or alarm management and processing. In a typical network environment, distributed network nodes typically notify the network's central network management server software application of any changes in the state of the network or of individual nodes. In general, the network management application or software may be run on one network server or simultaneously on a plurality of such servers. Such network management applications typically represent a single point, management interface for network administration.

Among the events or alarms typically monitored in a distributed network are distributed and node-specific events. In general, distributed events are those events that may affect the network as a whole. One example of a distributed event is the removal of a device port's entry from an associated Distributed Name Server. Such an event is considered a distributed event because it affects the Distributed Name Server on all of the network's Fibre Channel switches, for example.

Node-specific events, on the other hand, are typically concerned only with the state of an individual node. One example of a node-specific event is a FAN_FAILURE alarm. A FAN_FAILURE alarm is considered a node-specific event because it does not generally affect any nodes in the network other than the node where it originates.

Network management difficulties arise when the same distributed event is sent to the network management application by multiple nodes. If the network management application handles or processes each instance of the reported event without distinguishing whether each event is a different event or multiple copies of the same event, the network management application may suffer performance degradation resulting from double-handling, i.e., the repeated processing or addressing of the same events. Double-handling is typically most dangerous in situations where the network management application handles or processes events based on certain assumptions regarding the current state of the computer network. In other words, when the network management application receives a subsequent copy of the same event, the state of the network may have already been changed as a result of the network management application's handling of the previously reported event. At a minimum, double-handling consumes resources as the network management application attempts to repeatedly handle or process the same event.

Attempts to resolve the issue of double-handling include giving the multiple copies of the same event the same identity tag. In such an implementation, when the network management application receives notification of events, the network management application will begin by examining the identity tags. By examining the identity tags, the network management application can group those events with the same identity tags together, thereby enabling the network management application to handle or process the same event only once.

In reality, however, identity tags are impractical to implement. In one aspect, the need for the nodes to communicate with each other to agree on the identity tag every time they are going to send a notice of an event results in excessive network overhead. In a further aspect, the network management application generally has to keep a history of all the received tags in order to perform tag association.

SUMMARY OF THE INVENTION

The present invention overcomes the above-identified problems as well as other shortcomings and deficiencies by providing a system, apparatus and method for reducing the double-handling of distributed event messages in a computer network environment. In a primary aspect of the present invention, distributed event handling may be reduced by maintaining the availability of a proxy node that is responsible for reporting the distributed events to a network management station ("NMS").

The present invention provides the technical advantage of properly handling multiple instances of the same event received from the network nodes in a distributed network environment without double-handling while at the same time being able to receive and handle events unique to each individual network node.

The present invention further provides technical advantages through the reduction of instances of double-handling which simultaneously reduces usage of the network's processing resources. In one embodiment, network resource usage may be reduced by sending only one copy of each distributed event to the network management station ("NMS") and its associated applications for processing.

A further technical advantage provided by the present invention stems from the distributed event handling that is performed primarily by the network management station, eliminating processing efforts from network nodes. Such elimination is invaluable when using the network management station to monitor and manage the networks of third-party nodes.

In another respect, the present invention provides the advantage of reducing distributed event double-handling without consuming network management resources by pushing the elimination of redundant distributed event messages down to the network nodes.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention and its advantages are best understood by referring to FIGS. 1 through 4 of the drawings, like numerals being used for like and corresponding parts of the various drawings.

Figure 1:
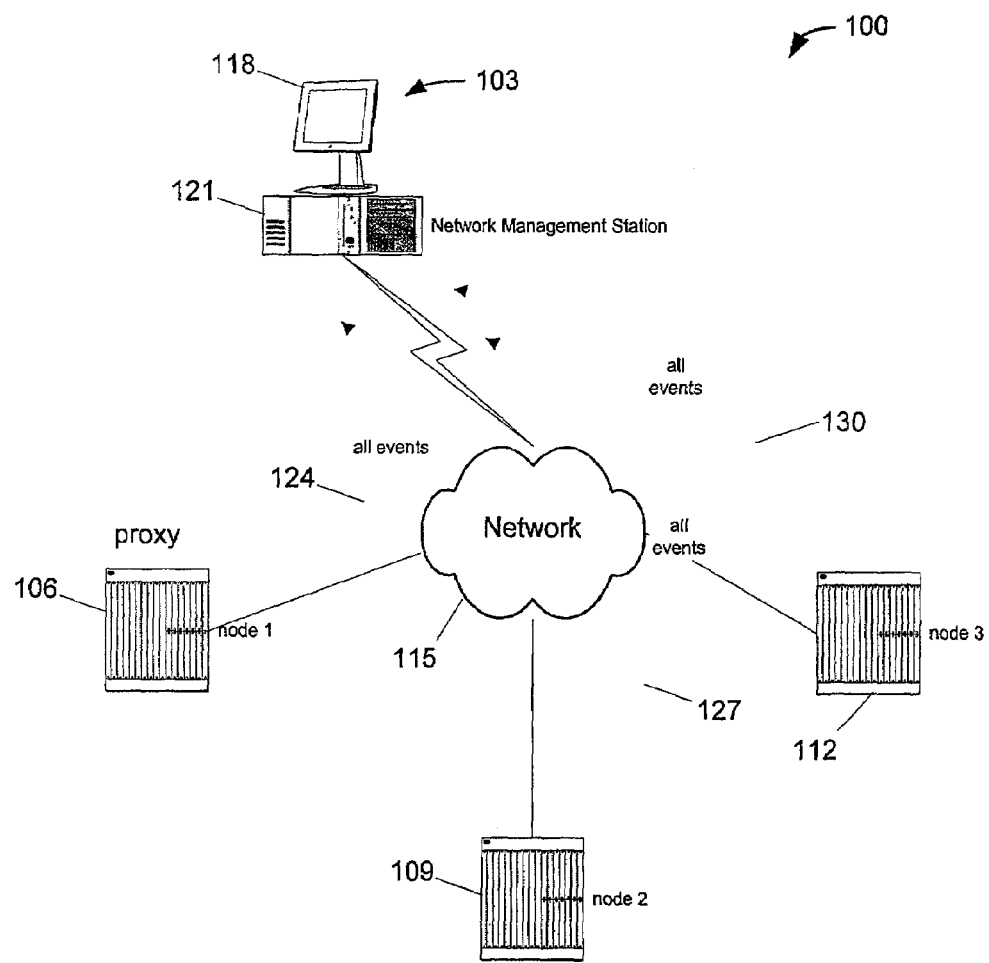
FIG. 1 is a schematic drawing depicting a computer network formed in accordance with teachings of the present invention.

Illustrated in FIG. 1 is an exemplary embodiment of a computer network incorporating teachings of the present invention. The computer network, indicated generally at 100, preferably includes one or more network management stations 103. The network management station 103 may be any computing device capable of performing the methods described herein as well as capable of communicating with nodes 106, 109 and 112 or the like via communication network 115.

In one embodiment, the network management station 103 may include a monitor or display 118, a central processing unit 121, one or more user input devices (not expressly shown). Examples of user input devices included, but are not limited to, a computer mouse, keyboard, touchscreen, voice recognition hardware and software, as well as other input devices. The central processing unit 121 may take many forms. For example, the central processing unit 121 may be a mainframe computer, a server computer a desktop computer, a laptop computer, application blade or any other computer device capable of responding to event messages generated and communicated by the network nodes 106, 109, and 112 as well as monitoring, repairing or otherwise managing computer network 100.

The network management station 103 preferably operates one or more network management applications in order to maximize the uptime, effectiveness, utilization and other operational characteristics of the computer network 100. In a network consisting of distributed network nodes, such as computer network 100, such network management applications are typically employed on a central network management station to provide a single point of network management for network administration.

Network management applications are typically operable to monitor, configure, test or otherwise manage generally all aspects of their associated computer networks and the computing components coupled to those networks. For example, a network management application may be configured to detect the addition of network nodes to the computer network. Further, the network management application may be able to detect the availability of individual network nodes or other devices coupled to the computer network. Preferably, the network management application is able to address event messages, distributed or node-specific, generated by the network nodes as well as to perform other network management functions and operations. A network management application may include a single software application or a plurality of software applications cooperating to achieve various network management functions.

The communication network 115 may include such network configurations as a local area network ("LAN"), wide area network ("WAN"), metropolitan area network ("MAN"), storage area network ("SAN"), their substantial equivalents or any combination of these and/or other network configurations. In addition, the communication network 115 may use physical or wireline communication protocols and media including, but not limited to, metal wires and cables made of copper or aluminum, fiber-optic lines, and cables constructed of other metals or composite materials satisfactory for carrying electromagnetic signals, electrical power lines, electrical power distribution systems, building electrical wiring, conventional telephone lines, coaxial cable, Ethernet, Gigabit Ethernet, Token Ring and Fibre Channel. Further, the communication network 115 may also use wireless communication schemes including, but not limited to, Bluetooth, IEEE 802.11b, infra-red, laser and radio frequency, including the 800 MHz, 900 MHz, 1.9 GHz and 2.4 GHz bands, in addition to or in lieu of one or more wireline communication schemes.

As illustrated in FIG. 1, a plurality of network nodes 106, 109 and 112 are preferably communicatively coupled to the communication network 115. The network nodes 106, 109 and 112 may be implemented using a variety of computing components. In general, each of the network nodes 106, 109 and 112 preferably includes at least one processor, and a memory and communication interface operably coupled to the processor (not expressly shown). Examples of network node devices suitable for use with the present invention include, but are not limited to, servers, mainframes, laptops, switches, routers, bridges, hubs, application blades or the like. The network nodes 106, 109 and 112 in a given computer network may include like devices or a variety of different devices.

In one embodiment of the present invention, the network nodes 106, 109 and 112 are preferably application blades, where an application blade may be defined as any electronic device that is able to perform one or more functions. For example, an application blade may be a peripheral card that is connected to a server or other device that is coupled to a switch. Other examples of application blades include, but are not limited to: remote computing devices communicatively coupled to the communication network 115 by a network connection; software processes running virtually on a single or multiprocessing system and/or single or multi-threading processor; electronic appliances with specific functionality; or the like.

In a typical computer network configuration, the network nodes coupled thereto generally report node-specific events, i.e., events generally affecting only the reporting node, and distributed events, i.e., events generally affecting the whole of the computer network, as they are detected, observed or otherwise become known to a network node. Arrows 124, 127, and 130 indicate generally the reporting of all events detected by the network nodes 106, 109, and 112, i.e., the reporting of both node-specific events and distributed events. As a result, repeated messages regarding the same distributed event are often reported to the network management station by a plurality if not all of the reporting enabled network nodes. The methods of the present invention reduce or eliminate the potential redundant handling of repeated distributed event messages by recognizing a proxy node from the plurality of network nodes that is responsible for reporting distributed events.

As shown in FIG. 1, the network node 106 may be designated as the proxy node for the computer network 100. In general operation, when the network management station 103 receives a distributed event message from the communication network 115, it preferably interrogates or otherwise identifies the source of the distributed event message to determine whether the distributed event message was originated or sent by the proxy node or network node 106 as illustrated in FIG. 1. If the network management station 103 determines that the distributed event message received was generated by or originated from the proxy node 106, then the network management station 103 preferably handles, processes or otherwise addresses the substance of the event, e.g., removal of a device port's entry from an associated Distributed Name Server. Alternatively, if the network management station 103 determines that the distributed event message was sent by a non-proxy node, such as network node 109 and/or 112, then the network management station 103 preferably further interrogates the distributed event message to determine whether the distributed event need be addressed by the network management station 103 or if the distributed event message can be discarded, delegated or otherwise unprocessed. All node-specific event messages from all of the reporting network nodes 106, 109, and 112 are preferably handled, processed or otherwise addressed by the network management station 103. Additional detail regarding the operational aspects of the present invention will be discussed below with reference to FIG. 2.

Figure 2:
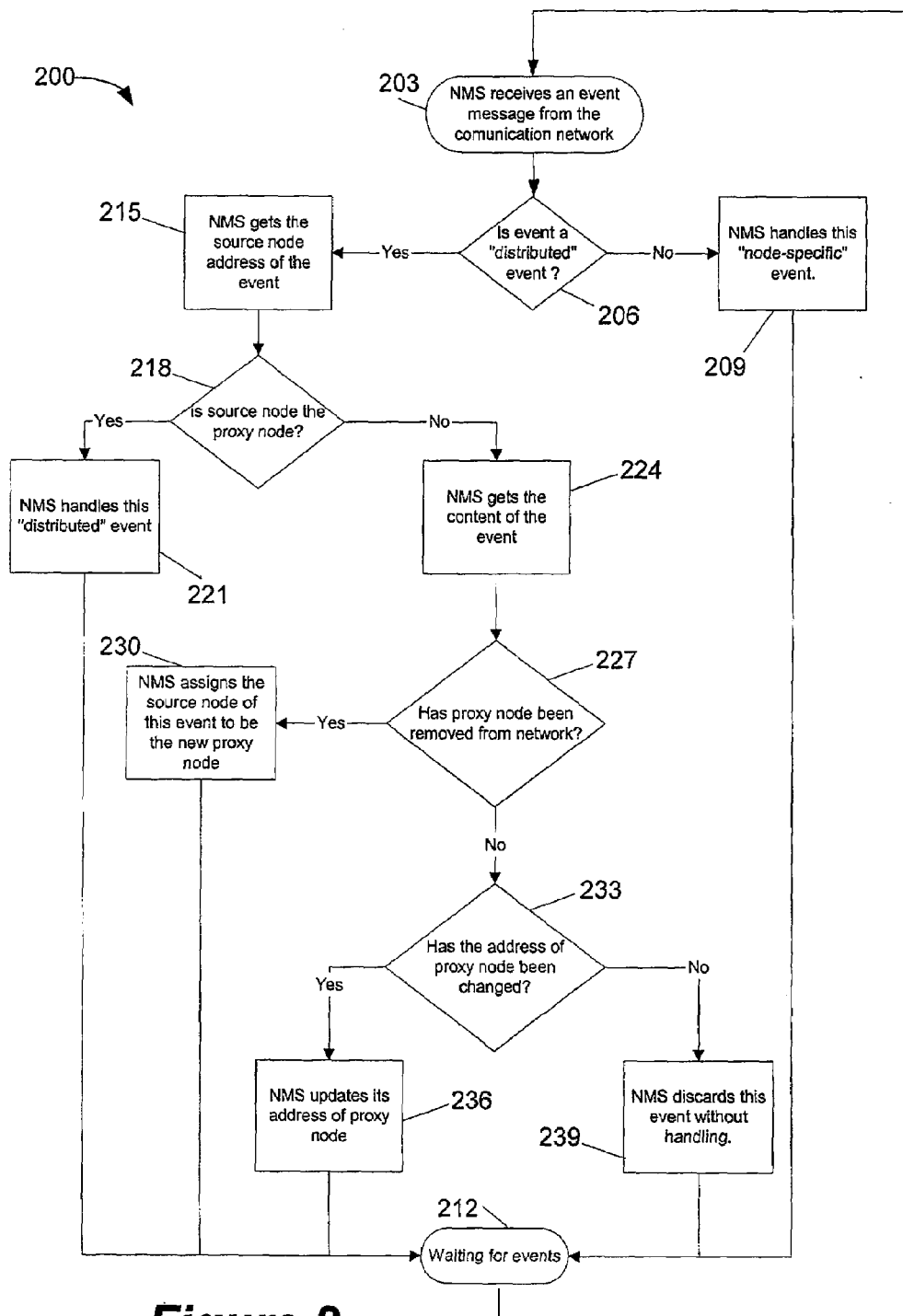
FIG. 2 is a flow diagram depicting a method for reducing the repeated handling of distributed network events according to teachings of the present invention.

Referring now to FIG. 2, a flow diagram illustrating a network management station based method of reducing or eliminating the repeated handling of distributed network event messages is shown, according to teachings of the present invention. Prior to the initiation of method 200, the network management station 103 preferably selects or designates one of its associated network nodes 106, 109, and 112 to initially serve as the proxy node. The initial selection of a proxy node may be made at random, according to a network address or according to a wide variety of other proxy node selection methods. Once a proxy node has been selected, the network management station 103 notes or stores the proxy node's identity, e.g., its network address, network interface card identifier, etc., for later comparison.

Method 200 preferably begins at step 203 where the network management station 103 is in receipt of an event message from the communication network 115. Upon receipt of the event message, method 200 preferably proceeds to step 206 where the event message may be evaluated to determine whether it contains a node-specific event or a distributed event.

If at step 206 the network management station 103 determines that the received event message contains a node-specific event, method 200 preferably proceeds to step 209. At step 209, the network management station 103 preferably addresses the node-specific event according to one or more network management settings. For example, if the node-specific event indicates that a cooling fan has failed at the network node reporting the node-specific event, the network management station 103 may generate an electronic message notifying a technician that the fan at the reporting or source network node needs maintenance. Alternatively, if the node-specific event indicates that an application on the reporting node is corrupt, or otherwise in need of repair, the network management station 103 may initiate a reinstall or software download and update routine to repair the corrupt application. Other methods of addressing, processing or otherwise handling node-specific events are contemplated within the spirit and scope of the present invention.

Once the network management station 103 has addressed, or initiated a response to the node-specific event, method 200 preferably proceeds to step 212 where the network management station 103 may await receipt of the next event message before returning to 203. In a further embodiment, the network management station 103 may verify that addressed or processed events were actually corrected and reinitiate processing in the instance the event persists.

If at step 206 the review of the received event message indicates that the event message pertains to a distributed event, method 200 preferably proceeds to step 215. At step 215 the network management station 103 may identify the address of origination for the distributed event message or otherwise identify the node from which the distributed event message was received or from which network node the distributed event message originated.

A variety of methods may be employed to identify the network node from which the distributed event message originated. Such methods include, but are not limited to, parsing a header included with the event message to obtain the network/Internet Protocol/Fibre Channel addressor other unique identifier of the sending network node. Another method of originating node identification may include parsing the distributed event message or a header associated with the distributed event message to locate and/or identify a unique identifier associated with the sending or originating node's network communication device such as a network interface card. Additional methods of identifying the source or origination of a received distributed event message are contemplated within the spirit and scope of the present invention.

Once the network management station 103 has obtained the information preferred to determine the originator or sender of the distributed event message, method 200 preferably proceeds to step 218. At step 218, the network management station 103 preferably determines whether the network node which sent the distributed event message is the proxy node 106 for the computer network 100 or whether the distributed event message originated from a non-proxy node 109 and/or 112. To determine whether the proxy node 106 or a non-proxy node 109 and/or 112 originated or sent the distributed event message, the network management station 103 may compare the sending address, the address of origination, or other unique identifier obtained from the distributed event message with stored information identifying the computer network's 100 proxy node selection. Alternative methods such as eliminating the non-proxy nodes 109 and/or 112 as being the sender of the distributed event message may also be employed.

If the network management station 103 determines that the distributed event was originated or sent by the proxy node 106, method 200 preferably proceeds to step 221. At step 221, the network management station 103 preferably initiates one or more routines to resolve the issue reported in the distributed event. As mentioned above, many network management station 103 or network management settings may be configured and used to address or process the various sorts of distributed events that may occur in the computer network 100. For example, a technician may be notified of repairs needed via an electronic communication generated by the network management station 103 or the network management station 103 may initiate a software routine directed at resolving the issue reported in the distributed event. Alternative methods of network management station 103 settings aimed at resolving distributed events are contemplated within the spirit and scope of the present invention.

Once the network management station 103 has addressed the content of a distributed event, method 200 preferably proceeds to step 212 where the network management station 103 may await receipt of the next event message before returning to step 203.

If at step 218 the network management station 103 determines that the distributed event message received originated or was sent by a non-proxy node 109 and/or 112, method 200 preferably proceeds to step 224. At step 224, the network management station 103 may access or otherwise evaluate the contents of the distributed event message to determine the issue being reported by the distributed event message. In a preferred embodiment, the network management station 103 preferably interrogates the distributed event messages received from a non-proxy node 109 and/or 112 to determine if the distributed event issue indicates a problem or a change associated with the proxy node 106. For example, the network management station 103 may wish to determine if the distributed event message received from a non-proxy node 109 and/or 112 indicates that the proxy node 106 has been removed from the communication network 115, that the proxy node's 106 identifier, e.g., network address, has changed, or that the proxy node 106 is otherwise unavailable.

Once the network management station 103 has accessed or interrogated the contents of the distributed event message originated or sent by a non-proxy node 109 and/or 112, method 200 preferably proceeds to step 227. At step 227, the network management station 103 may determine whether the distributed event message originated by a non-proxy node 109 and/or 112 indicates that the proxy node 106 has been removed or hidden from the network. If the distributed event message received from the non-proxy node 109 and/or 112 indicates that the proxy node 106 has been removed from the communication network 115, method 200 preferably proceeds to step 230.

At step 230, the network management station 103 preferably reassigns proxy status from the unavailable proxy node to the non-proxy node 109 and/or 112 that sent or originated the distributed event message being processed. For example, if the distributed event indicating that the proxy node 106 has been removed from the communication network 115 originated or was sent by non-proxy node 109, the network management station 103 may select or designate non-proxy node 109 as the new proxy node for the other non-proxy nodes in the computer network 100. Before reassigning proxy status, network management station 103 may be configured to execute one or more attempts to bring an unavailable proxy node back on line or to otherwise make an unavailable proxy node available again.

In an alternate implementation of method 200, the network management station 103 may initiate a routine to designate a non-proxy node 109 and/or 112 that will replace an unavailable proxy node. Other methods and implementations of designating a replacement proxy node are contemplated within the spirit and scope of the present invention.

Once the network management station 103 has addressed the removed or unavailable proxy node issue at step 230, method 200 preferably proceeds to step 212 where the network management station 103 may await receipt of the next event message before returning to step 203.

If at step 227 the network management station 103 determines that the contents of the distributed event message were originated or sent by a non-proxy node 109 and/or 112 indicates a problem other than the removal of the proxy node 106 from the communication network 115, method 200 preferably proceeds to step 233. At step 233, the network management station 103 preferably further evaluates the contents of the distributed event message to determine if the distributed event message indicates that the address of the proxy node 106 has been altered or otherwise changed.

In one example, the address of the proxy node 106 may be defined as a unique identifier for the proxy node 106 used by the network management station 103. Examples of such unique identifiers include, but are not limited to, the host/Internet Protocol ("IP") address in an IP network or the Fibre Channel address of the proxy node 106 in a Fibre Channel network. Thus, if the IP address of the proxy node 106 is used by the network management station 103 and a distributed event message from a non-proxy node 109 and/or 112 informs the network management station 103 that the proxy node's 106 IP address has changed, then the network management station 103 may update its proxy node 106 address with the new value.

If the distributed event message originated or sent by a non-proxy node 109 and/or 112 indicates that the address of the proxy node 106 has been changed, method 200 preferably proceeds to step 236. At step 236, the network management station 103 preferably updates a stored address for the proxy node 106 with the address reported in the distributed event message originated by a non-proxy node 109 and/or 112. Alternative implementations of updating the network address of the proxy node 106, include, but are not limited to, the network management station 103, on its own, verifying or otherwise obtaining the new network address for the proxy node 106 are contemplated within the spirit and scope of the present invention.

Once the network management station 103 has addressed the non-proxy node 109 and/or 112 originated distributed event message at step 236, method 200 preferably proceeds to step 212 where the network management station 103 may await receipt of the next event message before returning to step 203.

If at step 233 the network management station 103 determines that the distributed event message originated or sent by a non-proxy node 109 and/or 112 does not indicate that the address of the proxy node 106 has been changed, method 200 preferably proceeds to step 239. At step 239 the distributed event message originated or sent by a non-proxy node 109 and/or 112 may be discarded by the network management station 103. Method 200 may be modified such that distributed event messages originated or sent by a non-proxy node 109 and/or 112 are discarded only after the network management station 103 determines that the distributed event messages have or will have no effect on the proxy node 106 if not addressed. The network management station 103 may also be configured to delegate distributed event handling where the distributed event message does not affect the proxy node 106.

Once the network management station 103 has addressed the distributed event message originated or sent by a non-proxy node at step 239, method 200 preferably proceeds to step 212 where the network management station 103 may await receipt of the next event message before returning to step 203.

As described, method 200 provides numerous advantages over existing distributed event handling methods. One such advantage is that method 200 does not require the network nodes 106, 109 and 112 to take part in the proxy node selection process; for computer networks composed of heterogeneous network nodes, such network node participation may be impractical to implement. An additional advantage of method 200 is that, compared to those network management systems that only monitor and handle events from an individual node in the network, method 200 will not miss distributed events even if the network node they are monitoring is not the proxy node.

Figure 3:
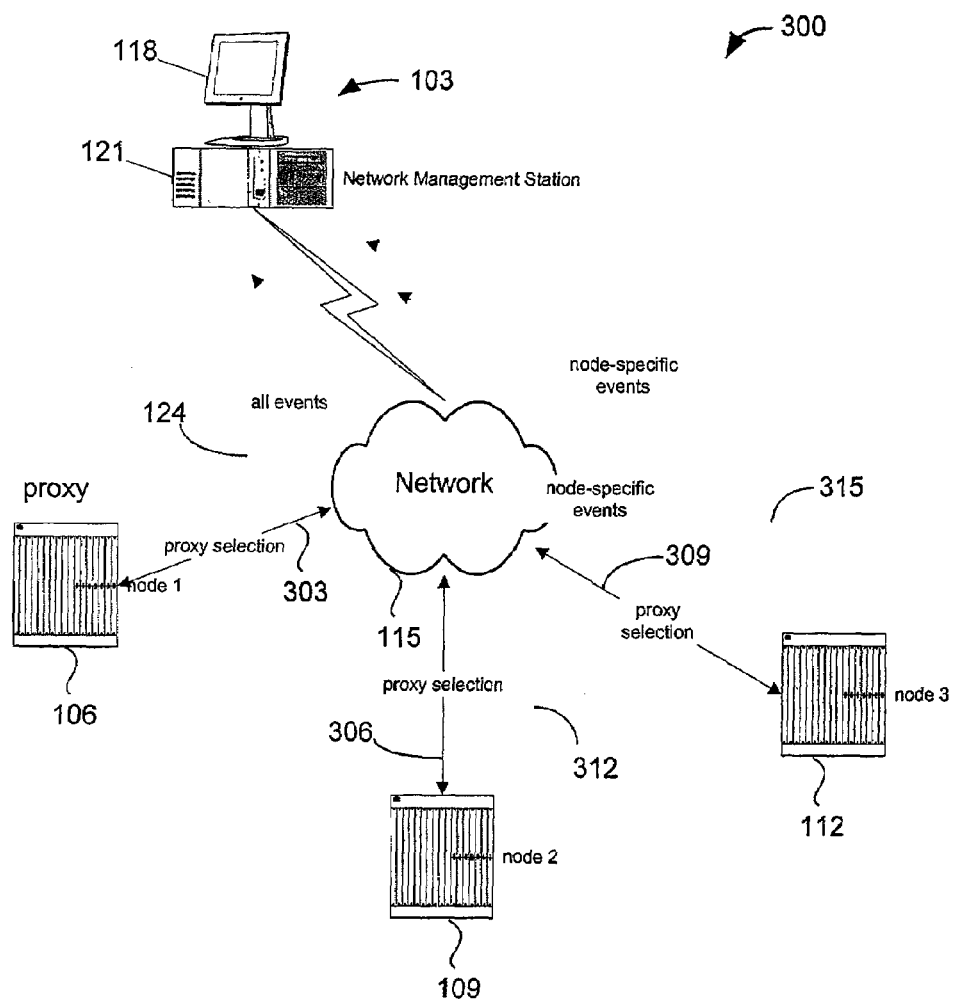
FIG. 3 is a schematic drawing diagram depicting an alternate embodiment of a computer network formed in accordance with teachings of the present invention.

Illustrated in FIG. 3 is an exemplary embodiment of a computer network, similar to computer network 100, incorporating teachings of the present invention. Among the similarities between computer network 100, illustrated in FIG. 1, and computer network 300, are network management station 103, network nodes, 106, 109 and 112 and communication network 115. Other similarities, such as the monitor a 118 and the central processing unit 121 of the network management station 103, are also present.

Computer network 300 differs, however, from the computer network 100 illustrated in FIG. 1 in its implementation of distributed event handling reduction. Specifically, the computer network 300 illustrated in FIG. 3 preferably implements method 400, illustrated in FIG. 4, to reduce distributed event reporting to the network management station 103.

In general, method 400, as described in greater detail below, preferably enables the network nodes 106, 109 and 112 to select by and among themselves a proxy node, e.g., network node 106, as indicated generally at arrows 303, 306 and 312. Upon doing so, the proxy node 106 is preferably enabled to report both distributed events and node-specific events to the network management station 103, as indicated generally by arrow 124. Network or non-proxy nodes 109 and/or 112, on the other hand, are preferably configured to report only node-specific events, as indicated generally by arrows 303 and 306 so long as the proxy node 106 remains on line or available. As a result, the proxy node 106 is the primary network node responsible for reporting distributed events to the network management station 103 while it is available. Such a configuration reduces network traffic and the double-handling of distributed events as reported by other methods. As will be discussed in greater detail below, should the proxy node 106 become unavailable, the non-proxy nodes 109 and/or 112 will preferably select a new proxy node and continue operation of the computer network 300 according to method 400.

Figure 4:
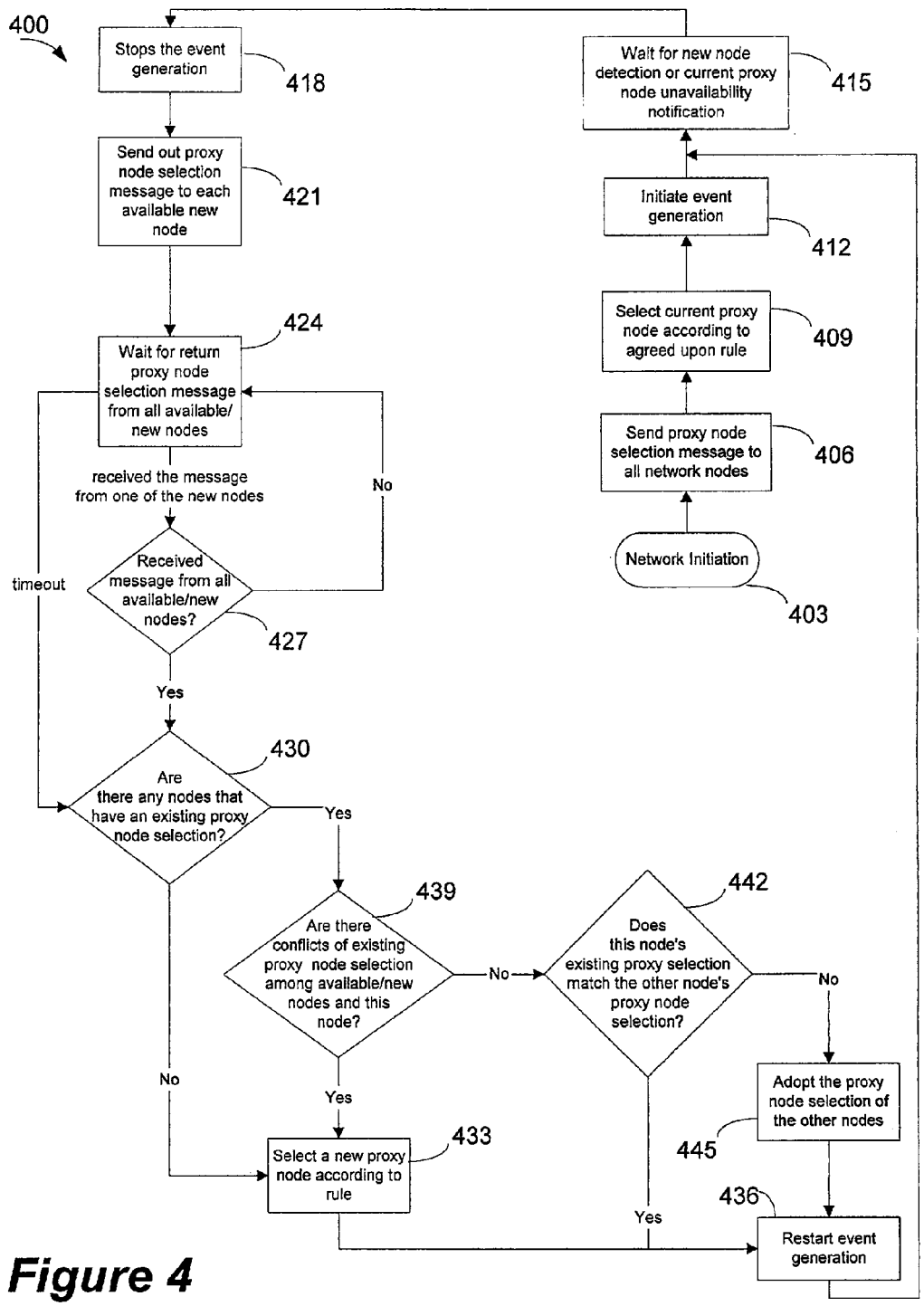
FIG. 4 is a flow diagram depicting a method for reducing distributed event messaging through the maintenance of a proxy node by and among the network nodes, according to teachings of the present invention.

The network distributed event handling method of FIG. 4 generally functions by placing the intelligence of avoiding double-handling into the network nodes 106, 109 and 112. In method 400 generally, a network node 106, 109 and 112 is agreed upon as the proxy node by all the network nodes participating in proxy node selection or available on the communication network 115. Instead of the network management station 103 designating a proxy node, all the network nodes 106, 109 and 112 are participants in the proxy node selection process. Once a proxy node has been selected, only the proxy node will report distributed events. Both the proxy node and the non-proxy nodes, on the other hand, are preferably configured to report, message or send out node-specific events to the network management station 103.

Depicted in FIG. 4 is a method for selecting a proxy node from a plurality of network nodes and where the proxy node selection is made entirely by the network nodes themselves, according to teachings of the present invention. For a newly established, upstart or otherwise initial run of a computer network, method 400 begins generally at step 403. Method 400 may be modified to operate on a newly configured computer network or an existing computer network such that method 400 maintains operation of the computer network according to teachings of the present invention.

Upon initiation of the network at step 403, method 400 preferably proceeds to step 406. At step 406, assuming for purposes of description that method 400 is being implemented on a newly established computer network, a proxy node selection message is preferably sent by and between all of the network nodes 106, 109 and 112 in the computer network 300. The proxy node selection message transmission may be initiated and sent by a selected one of the network nodes 106, 109 and 112 by design, e.g., a network administrator may designate a node to initiate proxy node selection, or the first node to detect an event to be reported may be the node to initiate proxy node selection. Preferably included in each proxy node selection message are both information pertaining to the source node of the proxy node selection message and the existing proxy node selection known to be the source node, if any is so known.

Once a proxy node selection message has been transmitted by and between each of the network nodes 106, 109 and 112 participating in the proxy node selection process, the network nodes 106, 109 and 112 may begin the proxy node selection process at step 409. The embodiment of method 400 illustrated in FIG. 4 assumes that new network nodes do not have an existing proxy node selection available to them. However, using the teachings below regarding network nodes having an existing proxy node selection available to them, method 400 may be altered or modified such that a newly established network utilizes the existing proxy node selections available.

At 409, a proxy node selection is made by the new network nodes using an agreed upon selection rule. For example, the agreed upon selection rule may be derived from the physical layout of the network nodes and their associated communication network. Alternatively, the agreed upon selection rule may select a proxy node based on the IP address of the nodes, a Fibre Channel network address or on time stamps associated with the exchanged proxy node selection messages. The proxy node selection rule may be established at the deployment of method 400 by a network administrator, for example. Additional proxy node selection rules are contemplated within the spirit and scope of the present invention.

Once a current or initial proxy node for the computer network has been selected according to the agreed upon proxy node selection rule at step 409, method 400 preferably proceeds to step 412. At step 412, event detection and generation or monitoring may be initiated in the current proxy node 106 and the non-proxy nodes 109 and/or 112, i.e., those network nodes not currently designated as the proxy node.

According to teachings of the present invention and method 400, the current proxy node 106 and non-proxy nodes 109 and/or 112 are preferably configured for event detection, generation and monitoring differently. Specifically, the current proxy node 106 is preferably configured to detect and report both distributed events and node-specific events. The current or initial non-proxy nodes 109 and/or 112 are preferably configured only to detect and report node-specific events, so long as the current or initial proxy node 106 remains available. At this point, in any event, the computer network 300 is preferably available for use and each non-proxy node 109 and/or 112 is preferably monitoring itself for node-specific events and the proxy node 106 is preferably both monitoring itself for node-specific events and monitoring the computer network 300 for distributed events.

From step 412, method 400 preferably proceeds to step 415 which is preferably a wait state for the network management station 103. At step 415, the computer network 300 is preferably operating as desired, transferring communications as requested, etc. In addition, the computer network 300 is preferably being monitored for the addition of new nodes. Monitoring and notification of the presence of new nodes may be accomplished using a variety of methods. For example, as a new node is added to the computer network 300, the new node may be configured to transmit a signal to the existing nodes on the network that it has been added. Alternatively, the network management station 103 may be configured to periodically poll the computer network 300 to detect the presence of new nodes, detect missing nodes as well as to accomplish other network management goals. In yet another example, the current proxy node 106 or one of the current non-proxy nodes 109 and/or 112 may be configured to monitor the computer network 300 for the addition of new network nodes.

In addition to monitoring the computer network 300 for new network nodes at step 415, method 400 is preferably also monitoring the availability of the current proxy node 106. According to teachings of the present invention, in the event the current proxy node 106 becomes unavailable, method 400 preferably initiates a new proxy node selection process generally as described below.

Monitoring the availability of the current proxy node 106 may be accomplished using a variety of processes. For example, once the current proxy node 106 has been selected, in addition to configuring the current proxy node 106 to report both distributed events and node-specific events, the current proxy node 106 may be configured such that it provides a heartbeat signal to the non-proxy nodes 109 and/or 112. In such an implementation, when one of the non-proxy nodes 109 and/or 112 ceases to receive the heartbeat signal from the current proxy node 106, the non-proxy node 109 and/or 112 may verify the unavailability of the proxy node 106 and/or initiate the selection process for a replacement proxy node. In an alternate implementation, one or more of the non-proxy nodes 109 and/or 112 may be configured to periodically verify that the current proxy node 106 is available. In the event a non-proxy node 109 and/or 112 is unable to communicate with the current proxy node 106 or otherwise determines that the current proxy node 106 is unavailable, the process of selecting a replacement or new proxy node may be initiated by discovering non-proxy node 109 and/or 112.

In the event a new network node is added to or detected on the computer network 300 or in the event the current proxy node 106 has been determined to be unavailable, method 400 preferably proceeds to step 418. At step 418, event generation in the computer network 300, i.e., in the network nodes 106, 109 and 112, is preferably stopped or paused. Once event generation has been stopped or paused, method 400 preferably proceeds to step 421. At step 421, the process of selecting a new or replacement proxy node may be initiated. The proxy node selection process may vary slightly at step 421 depending on whether the proxy node selection process was initiated in response to the addition of a new node to the computer network 300 or in response to the unavailability of the current proxy node 106.

In response to the addition of a new node to the computer network 300, a proxy node selection message is preferably sent to each new node added to the network at step 421. In an exemplary embodiment of the present invention, the current proxy node 106 may be responsible for initiating the exchange of proxy node selection messages with the new network nodes. In the event that both new nodes have been added to the computer network 300 and the current proxy node 106 is unavailable, one of the non-proxy nodes 109 and/or 112 may be responsible for sending out the proxy node selection message to the new nodes and the remaining available nodes. Alternatively, in such an event, the network management station 103 may be responsible for initiating the proxy selection process, the remaining steps of the proxy selection process preferably being performed by the available network nodes, without additional input or support from the network management station 103.

Alternatively, if proxy node selection messages are being sent in response to the unavailability of the current proxy node 106, the proxy node selection messages are preferably exchanged by and between all of the non-proxy nodes 109 and/or 112 and/or all of the network nodes available on the communications network 115 at step 421. In an exemplary embodiment, the non-proxy node 109 and/or 112 detecting and/or determining the unavailability of the current proxy node 106 may be responsible for initiating the exchange of proxy node selection messages between the appropriate non-proxy and network nodes. In addition, in such an event, the non-proxy node 109 and/or 112 initiating a new proxy node selection process may indicate the unavailability of the current proxy node 106 to the remaining non-proxy nodes 109 and/or 112 such that each may release their current proxy node selection setting. Alternative implementations of proxy node selection message initiation and generation are contemplated within the spirit and scope of the present invention.

Once the proxy node selection messages have been exchanged by and between the appropriate network nodes, both new and non-proxy, method 400 preferably proceeds to step 424. At step 424, the available network nodes preferably wait for the proxy node selection messages from each of the other nodes participating in the proxy node selection process. For example, in the newly added network node scenario described above, the current proxy node 106 and the existing non-proxy nodes 109 and/or 112 will preferably wait for return proxy node selection messages from each of the newly added network nodes. Alternatively, if the current proxy node 106 is managing the proxy node selection process with the new network nodes, the current proxy node 106 may remain in wait at step 424.

Upon receipt of each return proxy node selection message, method 400 preferably proceeds to step 427 where a check is made to determine if the returning proxy node selection messages have been received from all of the nodes participating in the proxy node selection process, for example, from all of the new network nodes. If it is determined that there are nodes from which a return proxy node selection message has not been received, method 400 preferably returns to step 424 where the remaining return proxy node selection messages may be awaited. If it is determined that all of the nodes participating in the proxy node selection process have returned a proxy node selection message, method 400 preferably proceeds to step 430. Alternatively, if method 400 has returned to step 424 to await additional return proxy node selection messages but no additional return proxy node selection messages are received within some defined time window, method 400 may proceed to step 430.

At step 430, a determination is made as to whether any of the return proxy node selection messages contain an existing proxy node selection. As mentioned above, the proxy node selection messages preferably include both information as to the source of the proxy node selection message and information as to the existing proxy node selection known to the source node, if any. For example, if proxy node selection was initiated in response to the addition of nodes to the computer network 300, each of the existing non-proxy nodes 109 and/or 112 and the proxy node 106 already on the computer network 300 should each indicate an existing proxy node selection, i.e., the current proxy node 106. Alternatively, if the proxy node selection process was initiated in response to the unavailability of the current proxy node 106, each of the return proxy node selection messages from the non-proxy nodes 109 and/or 112 participating in the new proxy node selection process may not have an existing proxy selection, e.g., each non-proxy node 109 and/or 112 may have released its existing proxy node selection setting in response to the knowledge that the current proxy node 106 has become unavailable.

If at step 430 it is determined that there are no existing proxy selections in the return proxy node selection messages, method 400 preferably proceeds to step 433. At step 433, a new proxy node may be selected from the nodes available on the computer network 300 according to a selection rule agreed upon by the nodes. Examples for such a rule include, but are not limited to, an Internet Protocol address based rule, a Fibre Channel node World Wide Name based rule and an earliest time stamp based rule using the timestamps preferably included in the proxy node selection messages, as mentioned above.

Upon selection of a new or replacement proxy node by agreed upon rule at step 433, method 400 preferably proceeds to step 436 where event generation may be restarted according to the new arrangement of non-proxy nodes and the newly selected proxy node. For example, the new proxy node may be configured to monitor and report both distributed and node-specific events and to monitor the network for new nodes while the non-proxy nodes may be configured to report only node-specific events and to monitor the availability of the new proxy node. From step 436, method 400 preferably returns to step 415 where the addition of nodes to the network and the unavailability of the new proxy node are preferably monitored and awaited by the network management station 103.

If at step 430 it is determined that one of the return proxy node selection messages contains an existing proxy selection, method 400 preferably proceeds to step 439. At step 439, each of the nodes or a managing node, e.g., the current proxy node 106 or the non-proxy node 109 and/or 112 detecting the unavailability of the current proxy node 106, in receipt of return proxy selection messages preferably determines whether the existing proxy node selections indicated in the return proxy node selection messages received from the other nodes are in conflict with or match one another. If it is determined that there is a conflict or that the existing proxy node selections do not match, method 400 preferably proceeds to step 433 where the participating network nodes use an agreed upon rule for selecting a new proxy node generally as described above. Alternatively, if a single network node is evaluating whether there is a conflict among the existing proxy node selections, that network node may generate a message indicating such a conflict to the remaining participating network nodes and the need to proceed to step 433 for selection of a new proxy node by agreed upon rule. If it is determined that there are no conflicts or that the existing proxy node selections indicated in the return proxy selection messages match one another, method 400 preferably proceeds to step 442.

At step 442, a determination is made whether the proxy node selection submitted by and matching amongst the other participating network nodes matches with the evaluating or current network node's own existing proxy node selection, e.g., the managing node or each node in receipt of a return proxy node selection message. If the current node determines that the proxy node selection submitted matches its own proxy node selection, method 400 preferably proceeds to step 436 where event generation and reporting may be re-initiated generally as described above. Alternatively, if at step 442 the evaluating network node determines that it either does not have an existing proxy node selection or that its existing proxy node selection does not match or conflicts with the existing proxy node selection submitted by the remaining network nodes, method 400 preferably proceeds to step 445. At step 445, the current network node adopts the existing proxy node selection submitted by the remaining network nodes such that all participating network nodes now recognize the same new proxy node for the computer network 300. From step 445, method 400 preferably proceeds to step 436 where event generation, a described above, may be initiated.

Method 400 provides numerous advantages over existing distributed event handling methods. One advantage of method 400 is that method 400 does not require the involvement of the network management station 103 for purposes other than processing node-specific and distributed events, i.e., the network management station 103 is not needed for proxy selection or for ensuring proxy availability, thus the resources of the network management station 103 may be reserved for event handling and other significant network management processing. In addition, method 400 reduces network traffic by preferably sending the network management station 103 only one copy of each distributed event.

As described herein, methods 200 and 400 provide clear advantages over the existing distributed event handling solutions. One such advantage is the elimination or reduction in double-handling when the network management station 103 receives multiple copies of the same event. As such, the methods described herein reduce the processing resources associated with double-handling, thereby freeing such resources for other processing or network management applications.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described exemplary embodiments of the invention are exemplary only, and are not exhaustive of the scope of the invention. Consequently, it is intended that the invention be limited only by the spirit and scope of the appended claims, giving full cognizance to equivalents in all respects.

What is claimed is:

1. A method for processing event messages comprising:
   receiving distributed events and node-specific events from a computer network by a network management station, each of said events having an event message;
   determining, at the network management station, if the distributed events include a first distributed event message originated by an existing proxy node or a second distributed event message originated by a non-proxy node when the second distributed event message indicates a problem concerning the existing proxy node;
   processing the event message at the network management station according to at least one network management setting when the event message is selected from the group consisting of:
   a node-specific event message,
   the first distributed event message originated by the existing proxy node, and
   the second distributed event message originated by a non-proxy node when the second distributed event message indicates a problem concerning the existing proxy node;
   discarding all other distributed event messages originated by the non-proxy node.

2. The method of claim 1 further comprising selecting the existing proxy node from one of a plurality of network nodes coupled to the computer network.

3. The method of claim 2 wherein the network management station is operable to select the existing proxy node.

4. The method of claim 1 further comprising selecting a new proxy node from a plurality of available non-proxy nodes in response to existing proxy node unavailability.

5. The method of claim 1 wherein the problem concerning the existing proxy node is unavailability.

6. The method of claim 1 wherein the problem concerning the existing proxy node is removal of the existing proxy node from the computer network.

7. The method of claim 1 wherein the problem concerning the existing proxy node is a change in a network address associated with the existing proxy node.

8. The method of claim 7 further comprising updating a stored address for the existing proxy node according to the changed network address.

9. A computer network comprising:
   a plurality of network nodes, including a proxy node and a plurality of non-proxy nodes, the network nodes operably coupled to a communication network and operable to communicate node-specific event messages and distributed event messages via the communication network to a network management station; and
   the network management station operable to:
   receive event messages from the network nodes,
   identify the node-specific event messages and the distributed event messages,
   determine if the distributed event messages are originated by the proxy node or originated by the non-proxy nodes when the distributed event messages indicate a problem with the existing proxy node,
   process an event message when the event message is a node-specific event message, a first distributed event message received from the proxy node, or a second distributed event message associated with proxy node availability, and
   discard unprocessed distributed event messages received from the non-proxy node.

10. The computer network of claim 9 further comprising the network management station operable to process the distributed event messages received from a non-proxy node if the non-proxy node distributed event message is associated with proxy node availability.

11. The computer network of claim 9 further comprising the network management station operable to select the proxy node from the plurality of network nodes.

12. The computer network of claim 9 further comprising: at least one non-proxy node operable to transmit a distributed event message indicating removal of the proxy node from the communication network; and the network management station operable to select a new proxy node from the plurality of non-proxy nodes.

13. The computer network of claim 9 further comprising: at least one of the plurality of non-proxy nodes operable to transmit a distributed event message indicating a network address change associated with the proxy node; and the network management station operable to update a stored network address associated with the proxy node according to the distributed event message from the non-proxy node.

14. The computer network of claim 9 further comprising the network management station operable to select a new proxy node from the plurality of non-proxy nodes in response to proxy node unavailability.

* * * * *